(12) United States Patent
Dong et al.

(10) Patent No.: US 11,080,274 B2
(45) Date of Patent: *Aug. 3, 2021

(54) BEST-EFFORTS DATABASE FUNCTIONS

(71) Applicant: Futurewei Technologies, Inc., Plano, TX (US)

(72) Inventors: Yu Dong, San Jose, CA (US); Qingqing Zhou, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1032 days.

This patent is subject to a terminal disclaimer.

(21) Appl. No.: 15/408,130

(22) Filed: Jan. 17, 2017

(65) Prior Publication Data

US 2018/0203895 A1    Jul. 19, 2018

(51) Int. Cl.
*G06F 16/2452* (2019.01)
*G06F 16/2458* (2019.01)
*H04L 12/931* (2013.01)

(52) U.S. Cl.
CPC .... *G06F 16/24524* (2019.01); *G06F 16/2471* (2019.01); *H04L 49/35* (2013.01)

(58) Field of Classification Search
CPC ......... G06F 16/24524; G06F 16/24532; G06F 16/2471; H04L 49/35
See application file for complete search history.

(56) References Cited

U.S. PATENT DOCUMENTS

| 6,922,410 B1 * | 7/2005 | O'Connell ........ H04L 29/12009 370/389 |
| 7,099,444 B1 | 8/2006 | Russell |

(Continued)

FOREIGN PATENT DOCUMENTS

| CN | 101635741 A | 1/2010 |
| CN | 104065521 A | 9/2014 |

(Continued)

OTHER PUBLICATIONS

"International Application No. PCT/CN2018/072910, International Search Report and Written Opinion dated Apr. 13, 2018", (dated Apr. 13, 2018), 10 pgs.

(Continued)

*Primary Examiner* — Jesse P Frumkin
(74) *Attorney, Agent, or Firm* — Schwegman Lundberg & Woessner. P.A.

(57) ABSTRACT

A computer-implemented method and system at a network switch provides using one or more processors to perform a pre-defined database function on query data contained in data messages received at the network switch, with the performing producing result data, and wherein the predefined database function is performed on the query data in a first mode of operation to a state of full completion, generating complete result data and no skipped query data, and in a second mode of operation to a state of partial completion, generating partially complete result data and skipped query data. Further, the method and system performing one or more network switch functions to route the complete result data, and/or route the partially complete result data and skipped query data, to one or more destination nodes. In addition, an application programming interface (API) is used to define the database function.

20 Claims, 16 Drawing Sheets

(56) References Cited

U.S. PATENT DOCUMENTS

| | | | |
|---|---|---|---|
| 9,705,986 | B2 | 7/2017 | Caruana et al. |
| 10,805,241 | B2* | 10/2020 | Dong .................. H04L 49/356 |
| 2007/0286096 | A1 | 12/2007 | Alexander, Jr. et al. |
| 2007/0286196 | A1 | 12/2007 | Fan et al. |
| 2009/0232139 | A1* | 9/2009 | Kelley .................. H04L 49/354 |
| | | | 370/392 |
| 2010/0180016 | A1 | 7/2010 | Bugwadia et al. |
| 2011/0004698 | A1 | 1/2011 | Wu |
| 2011/0167083 | A1* | 7/2011 | Branscome ......... G06F 16/2453 |
| | | | 707/769 |
| 2011/0321051 | A1 | 12/2011 | Rastogi |
| 2013/0018919 | A1* | 1/2013 | Peek ................. G06F 16/24549 |
| | | | 707/780 |
| 2013/0275452 | A1* | 10/2013 | Krishnamurthy ........................... |
| | | | G06F 16/24532 |
| | | | 707/764 |
| 2014/0050223 | A1 | 2/2014 | Foo et al. |
| 2014/0180903 | A1* | 6/2014 | Parsons .................. G06Q 40/04 |
| | | | 705/37 |
| 2014/0181133 | A1* | 6/2014 | Parsons .................. G06Q 40/04 |
| | | | 707/758 |
| 2015/0135255 | A1 | 5/2015 | Theimer et al. |
| 2015/0180942 | A1 | 6/2015 | Kraljic et al. |
| 2016/0013990 | A1 | 1/2016 | Kulkarni et al. |
| 2016/0057226 | A1 | 2/2016 | Bestler et al. |
| 2016/0253417 | A1* | 9/2016 | Tran ...................... H04L 45/745 |
| | | | 707/706 |
| 2016/0321341 | A1* | 11/2016 | Ramamurthi ....... G06F 11/1471 |
| 2016/0357800 | A1* | 12/2016 | Lin ......................... G06F 16/23 |
| 2017/0085395 | A1 | 3/2017 | Koponen et al. |
| 2017/0147656 | A1* | 5/2017 | Choudhary ......... G06F 16/2471 |
| 2017/0289240 | A1 | 10/2017 | Ghare et al. |
| 2018/0025052 | A1* | 1/2018 | Nambiar ............. G06F 16/2455 |
| | | | 707/713 |
| 2018/0205672 | A1* | 7/2018 | Dong .................. H04L 67/1097 |
| 2019/0007513 | A1 | 1/2019 | Flynn, IV et al. |

FOREIGN PATENT DOCUMENTS

| | | |
|---|---|---|
| CN | 104320442 | 1/2015 |
| CN | 105681191 | 6/2016 |
| CN | 106162639 A | 11/2016 |

OTHER PUBLICATIONS

"TeraData website", (c) 2017 Teradata [online]. [archived on Dec. 30, 2017]. Retrieved from the Internet: <URL: https://web.archive.org/web/20171230022123/https://www.teradata.com/>, (2017), 2 pgs.

"U.S. Appl. No. 15/408,206, Final Office Action dated May 9, 2019", 18 pgs.

"U.S. Appl. No. 15/408,206, Non Final Office Action dated Sep. 23, 2019", 23 pgs.

"U.S. Appl. No. 15/408,206, Non Final Office Action dated Nov. 6, 2018", 13 pgs.

"U.S. Appl. No. 15/408,206, Response filed Jan. 30, 2019 to Non Final Office Action dated Nov. 6, 2018", 21 pgs.

"U.S. Appl. No. 15/408,206, Response filed Dec. 18, 2019 to Non Final Office Action dated Sep. 23, 2019", 11 pgs.

"U.S. Appl. No. 15/408,206, Response filed Sep. 5, 2019 to Final Office Action dated May 9, 2019", 12 pgs.

"European Application No. 18741749.8, Extended European Search Report dated Oct. 14, 2019", (dated Oct. 14, 2019), 7 pgs.

"European Application No. 18742094.8, Extended European Search Report dated Dec. 16, 2019", (dated Dec. 16, 2019), 9 pgs.

Li, Yunchun, et al., "An Parallelized Deep Packet Inspection Design in Software Defined Network", Proceedings of 2nd International Conference on Information Technology and Electronic Commerce, IEEE (ICITEC 2014), XP32776282, (Dec. 20, 2014), 6-10.

Yeganeh, Soheil Hassas, et al., "Kandoo: A Framework for Efficient and Scalable Offloading of Control Application", Hot Topics in Software Defined Networks, ACM, 2 Penn Plaza, Suite 701, New York, NY 10121; XP58008058, (Aug. 13, 2012), 19-24.

"International Application Serial No. PCT/CN2018/072911, International Search Report dated Apr. 13, 2018", 4 pgs.

"International Application Serial No. PCT/CN2018/072911, Written Opinion dated Apr. 13, 2018", 5 pgs.

"U.S. Appl. No. 15/408,206, Corrected Notice of Allowability dated Apr. 16, 2020", 2 pgs.

"U.S. Appl. No. 15/408,206, Notice of Allowance dated Mar. 25, 2020", 9 pgs.

"Chinese Application No. 201880006228.8, First Office Action dated Jan. 8, 2020", (dated Jan. 8, 2020), 16 pgs.

"Chinese Application No. 2018800062288, Chinese First Search dated Dec. 13, 2019", (dated Dec. 13, 2019), 2 pgs.

"U.S. Appl. No. 15/408,206, Corrected Notice of Allowability dated Jun. 30, 2020", 5 pgs.

"U.S. Appl. No. 15/408,206, Corrected Notice of Allowability dated Sep. 17, 2020", 6 pgs.

"U.S. Appl. No. 15/408,206, PTO Response to Rule 312 Communication dated Sep. 14, 2020", 2 pgs.

\* cited by examiner

--→ BROADCAST INNER TABLE DATA
—→ HASH TABLE BY NETWORK NODES

BEST-EFFORTS DATABASE FUNCTIONS

RELATED APPLICATIONS

This application is related to U.S. patent application Ser. No. 15/408,206, filed on Jan. 17, 2017, and entitled "Database Functions—Defined Network Switch and Database System."

FIELD OF THE INVENTION

The present disclosure is related distributed databases, and in particular to network switches and related methods used to route data between nodes of a distributed database system.

BACKGROUND

A modern distributed database, for example a massively parallel processing (MPP) database, may deploy hundreds or thousands of data nodes (DNs). Data nodes in a distributed database are interconnected by a network that includes network interface cards (NICs) on each node, network switches connecting nodes and other switches, and routers connecting the network with other networks, e.g., the Internet. Data nodes often need to exchange data messages to carry out database operations (e.g., join, aggregation, and hash, etc.) when processing a query received by the database system. These data messages can be, for example, table row data, certain column data, intermediate aggregation results of grouping, maximum or minimum of a subset of certain table rows, or intermediate result of a hash join.

The data messages are routed by the switches in the network to be delivered to the destination data nodes. A data node may send a data message to some or all of the other data nodes in the network to fulfill an operation of a query. Since a conventional network switch is not aware of the contents of data messages it forwards, it may forward duplicated or unnecessary data messages, which results in the waste of highly demanded network bandwidth and computation capacity on the destination data nodes.

SUMMARY

A network switching method comprises, using one or more processors, performing a pre-defined database function on query data contained in data messages received at a network switch, with the performing producing result data, wherein the pre-defined database function is performed on the query data in a first mode of operation to a state of full completion, generating complete result data and no skipped query data, and in a second mode of operation to a state of partial completion, generating partially complete result data and skipped query data. One or more network switch functions route the complete result data, and/or route the partially complete result data and skipped query data, to one or more destination nodes.

A network switch comprises a non-transitory memory storage comprising instructions, and one or more processors in communication with the memory storage, wherein the one or more processors execute the instructions to perform a pre-defined database function on data carried in data messages arriving at the network switch, with the performing producing processed result data, wherein the pre-defined database function can be performed to produce a completed state including complete processed result data or can be performed on a best-effort basis to produce a partially performed, incomplete state, including incomplete processed result data, and perform one or more network switch functions to route the processed result data, and/or the data carried in the data messages, to one or more destination nodes, wherein if the state of completion is a partially completed state, the network switch logic unit forwards the processed result data and any data not processed, to the one or more destination nodes.

A non-transitory computer-readable media storing computer instructions that when executed by one or more processors, cause the one or more processors to perform the steps of performing one or more pre-defined database functions on query data contained in data messages received at the switch, with the performing producing result data, wherein the pre-defined database function is performed on the query data to a state of full completion, generating complete result data and no skipped query data, and/or to a state of partial completion, generating partially complete result data and skipped query data, and routing the complete result data, and/or routing the partially complete result data and skipped query data, to one or more destination nodes.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

In example 1, a method performed at a network switch, comprises: using one or more processors, performing a pre-defined database function on query data contained in data messages received at the network switch, with the performing producing result data, wherein the pre-defined database function is performed on the query data in a first mode of operation to a state of full completion, generating complete result data and no skipped query data, and in a second mode of operation to a state of partial completion, generating partially complete result data and skipped query data; and performing one or more network switch functions to route the complete result data, and/or route the partially complete result data and skipped query data, to one or more destination nodes.

In example 2, there is provided a method according to example 1 further wherein the database function comprises an aggregation function, a caching function, a hashing function, a union/merge function, or an ordering/ranking function.

In example 3, there is provided a method according to examples 1 or 2 wherein a plurality of the switches are arranged in a hierarchy and wherein partially processed results are further processed in a second switch receiving the partially processed results from a first switch.

In example 4, there is provided a method according to examples 1-3 further wherein the query data is retrieved from one or more data storage sources, the retrieved data being carried in the data messages.

In example 5, there is provided a method according to examples 1-4 further wherein performing of the database function in the first mode of operation or in the second mode of operation is determined based at least in part on resources available to perform the database function.

In example 6, there is provided a method according to examples 1-5 further wherein the resources are selected from the group: memory, time, or processor bandwidth.

In example 7, there is provided a method according to examples 1-6 further comprising at least one database function rule used to perform the database function.

In example 8, there is provided a method according to examples 1-7 wherein the network switch functions further comprise classification or flow control functions.

In example 9, there is provided a method according to examples 1-8 further comprising data messages including the result data and queuing the data messages for routing to the one or more destination nodes.

In example 10, there is a network switch, comprising a non-transitory memory storage comprising instructions, and one or more processors in communication with the memory storage, wherein the one or more processors execute the instructions to perform a pre-defined database function on data carried in data messages arriving at the switch, with the performing producing processed result data, wherein the pre-defined database function can be performed to produce a completed state including complete processed result data or can be performed on a best-effort basis to produce a partially performed, incomplete state, including incomplete processed result data; and to perform one or more network switch functions to route the processed result data, and/or the data carried in the data messages, to one or more destination nodes, wherein if the state of completion is a partially completed state, the network switch logic unit forwarding the processed result data and any data not processed, to the one or more destination nodes.

In example 11, there is provided a switch according to example 10 further including a database server to process a database query requiring data to be retrieved from one or more data storage sources, the retrieved data being carried in the data messages.

In example 12, there is provided a switch according to examples 10 or 11 further wherein the best-efforts basis of the database function handling logic unit is determined at least in part on the processing capacity of the database function handling logic unit.

In example 13, there is provided a switch according to examples 10-12 further comprising a data storage to store at least one database function rule to perform the database function.

In example 14, there is provided a switch according to examples 10-13 wherein the network switch logic unit performs routing, classification, or flow control functions.

In example 15, there is provided a switch according to examples 10-14 wherein after the database function is performed, the processed result data is included in one or more data messages that are queued for forwarding to the one or more destination nodes.

In example 16, there is provided a switch according to examples 10-15 wherein the data messages further comprise instructions specifying at least one database function to perform on the data carried in the data message.

In example 17, there is provided a non-transitory computer-readable media storing computer instructions that when executed by one or more processors, cause the one or more processors to perform the steps of:

performing one or more pre-defined database functions on query data contained in data messages received at the switch, with the performing producing result data, wherein the pre-defined database function is performed on the query data to a state of full completion, generating complete result data and no skipped query data, and/or to a state of partial completion, generating partially complete result data and skipped query data; and routing the complete result data, and/or routing the partially complete result data and skipped query data, to one or more destination nodes.

In example 18, there is provided a non-transitory computer-readable media according to example 17 further wherein the data contained in the data messages received at the one or more processors further comprises complete result data or partially complete result data.

In example 19, there is provided a non-transitory computer-readable media according to examples 17 or 18 further wherein at least one of the destination nodes comprises a database server to generate a query requesting the query data.

In example 20, there is provided a non-transitory computer-readable media according to examples 17-19 further comprising an application programming interface means for creating or modifying database functions used by the means for performing one or more database functions.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Distributed Database with Database Function Defined (DFD) Network Switch

Figure 1:
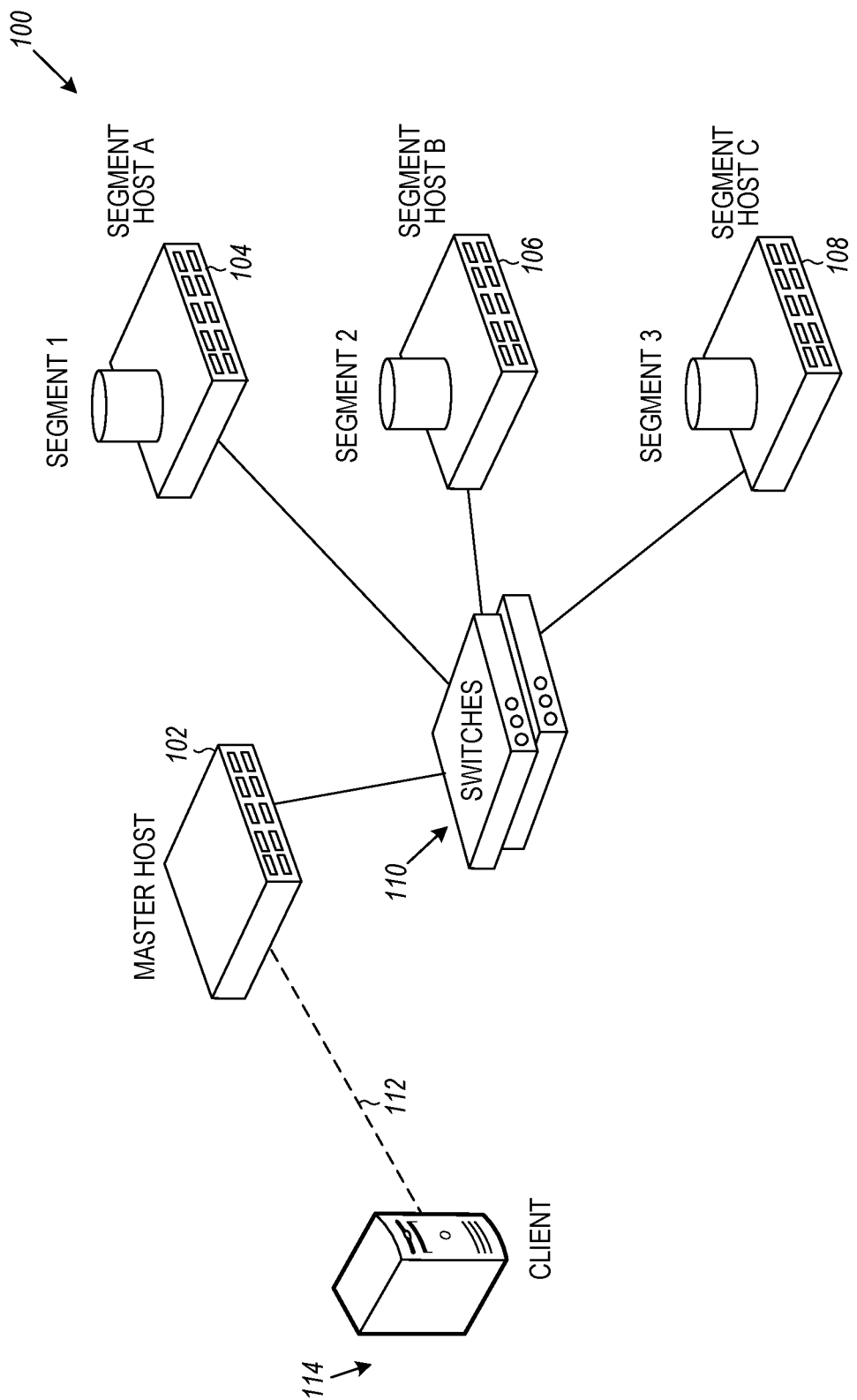
FIG. 1 is a distributed database system according to an example embodiment.

Referring to FIG. 1, there is illustrated an example embodiment of a distributed database system 100. According to one embodiment, the distributed database is optionally a massively parallel processing (MPP) database. As illustrated in FIG. 1, database system 100 includes a master host 102 that hosts a master database wherein the user data is distributed across data segments hosted on a plurality of segment hosts 104, 106 and 108 that maintain respective segment databases. The master host 102 includes a separate physical server with its own operating system (OS), processor, storage and random access and/or read-only memory. In one example embodiment, there is no user data stored in the master host 102, but the master host 102 stores metadata about database segments in segment hosts 104, 106 and 108 of the database. Segment hosts 104, 106 and 108 each also include physical servers with their own OS, processor, storage and memory. As used herein, the term "processor" shall include both software-programmable computing devices and/or such as programmable central processing units (as for example shown in FIG. 17), hardware circuits that are not programmable such as ASICs, and/or devices such as FPGAs, that are configurable circuits.

Master host 102 and segment hosts 104, 106 and 108, communicate through a network interface, such as a network interface card, to one or more database function-defined (DFD) network switches 110. According to one example embodiment, a DFD network switch 110 includes components that perform database functions, described below with respect to FIG. 3, and components to perform network switching functions. According to one embodiment, the network switching functions are performed by a multiport network bridge that uses hardware addresses to process and forward data at the data link layer of the Open Systems Interconnection (OSI) model. In another example embodiment, the DFD network switch 110 can in addition or in the alternative process data at the network layer by additionally incorporating routing functionality that most commonly uses IP addresses to perform packet forwarding.

According to one embodiment, data is distributed across each segment host 104, 106 and 108 to achieve data and processing parallelism. For example, this is achieved by automatically distributing data across the segment databases using hash or round-robin distribution. When a query 112 is issued by a client computer 114, the master host 102 parses the query and builds a query plan. In one example embodiment, the query is filtered on a distribution key column, so that the plan will be sent to only to the segment database(s) 104, 106, and 108 containing data applicable for execution of the query.

Figure 2:
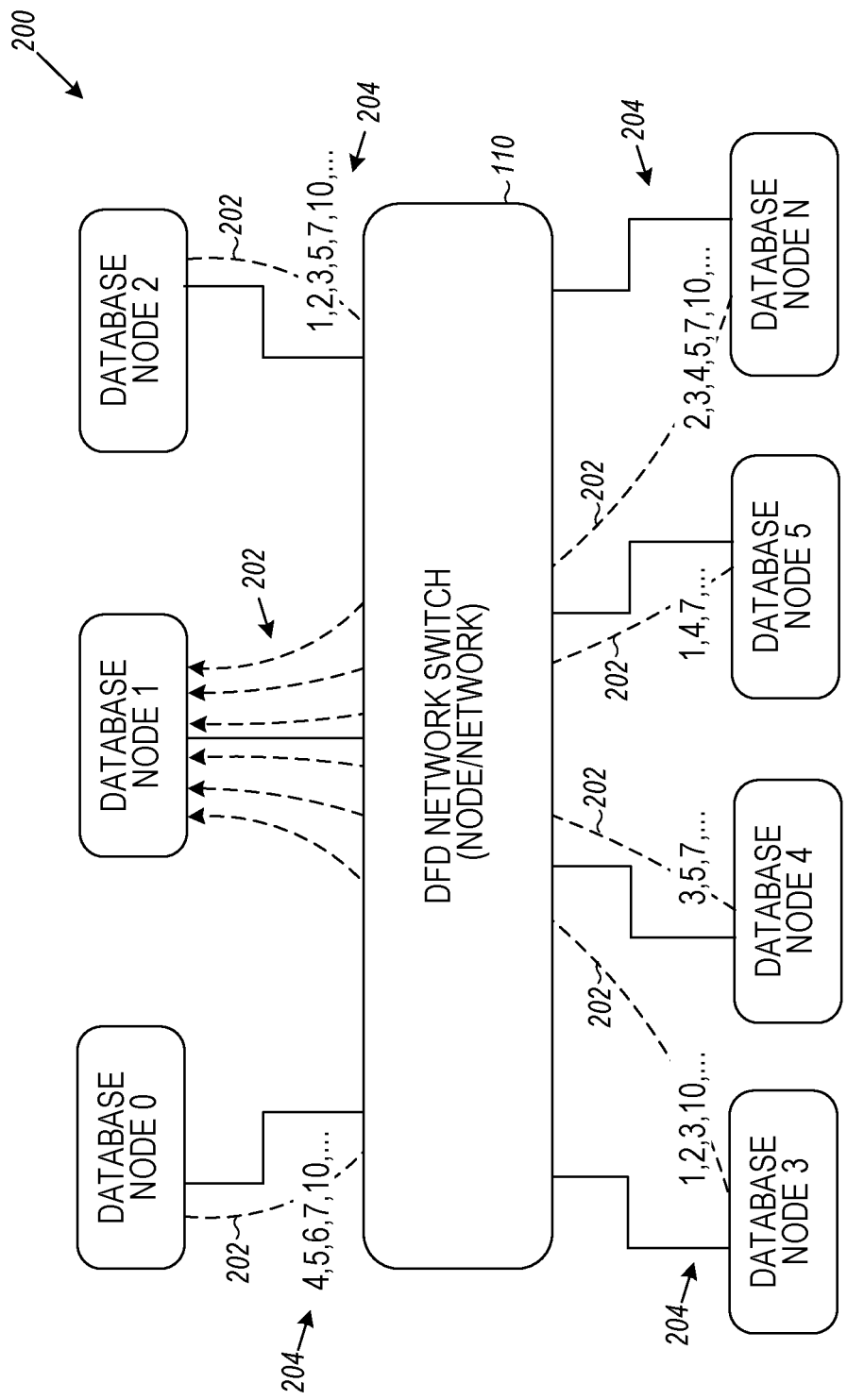
FIG. 2 is a dataflow diagram of a distributed database system according to an example embodiment.

Referring now to FIG. 2, there is illustrated a data flow diagram of a database system 200, wherein a database function or operation may require data exchanges through a DFD network switch 110 among different data nodes 0 to N. According to one embodiment, a data node 0-N can take the form, for example, of a database server such as master host 102, or a data source such as, but not limited to, a data storage system such as segment hosts 104, 106 and 108, of FIG. 1. A distributed database may deploy hundreds or thousands of data nodes 0-N. These data nodes are, for example, interconnected by a plurality of network switches, including but not limited to DFD network switches 110 in this embodiment, connecting nodes and other switches, and routers connecting the network with other networks, for example the Internet. In this example embodiment, data messages 202 originating from a data node 0-N are routed by the switches 110 in the network to be delivered to destination data nodes 0-N. According to one embodiment, data messages 202 are encapsulated in network packets, and contain, for example, table row data, column data, intermediate aggregation results of grouping, maximum or minimum of a subset of certain table rows, or an intermediate result of a hash join, as will described in more detail below.

In the example of FIG. 2, a DFD network switch 110 operates in a first mode of operation, not using its database function capabilities, to route data messages 202 from nodes 0, 2, 3, 4, 5, N, to data node 1, to fulfill an operation of a database query. For example, data node 1 may require data for a database function, i.e., retrieval of distinct values 204 from all other data nodes. For this function, each of the data nodes sends individual intermediate results of distinct values, in data messages 202 contained through the switch, to node 1. In this mode of operation, the transmission of these distinct values are "transparent" to the switch, in other words the switch 110 routes the messages in a conventional fashion without performing database functions on or with the data messages 202, as explained in more detail below. All of these data messages 202 are thus forwarded to and received by node 1. In many cases, however, the majority of the data messages 202 from the various data nodes are redundant— i.e., contain values not distinct from values contained in other messages, as illustrated wherein for example the value "7" originates from five different nodes 0, 2, 4, 5, N. As a result, network bandwidth and computation capacity of node 1 are wasted. Because, for example, a distributed database system may have hundreds, thousands, or even millions of such database functions being concurrently performed by all the data nodes, wasted or redundant messaging can have a large impact on and result in sub-optimal overall database system performance.

Figure 3:
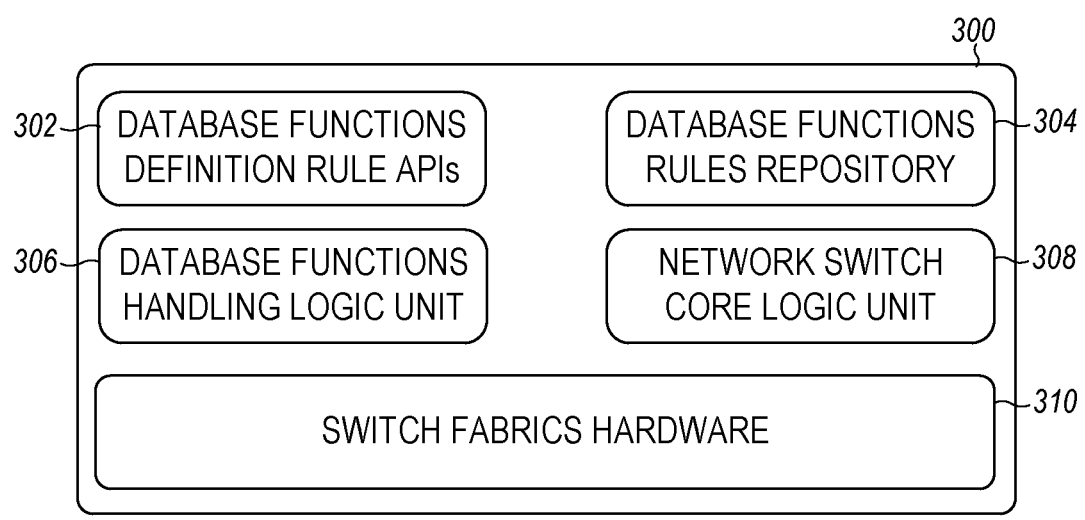
FIG. 3 is a database function-defined (DFD) network switch according to an example embodiment.
Figure 4:
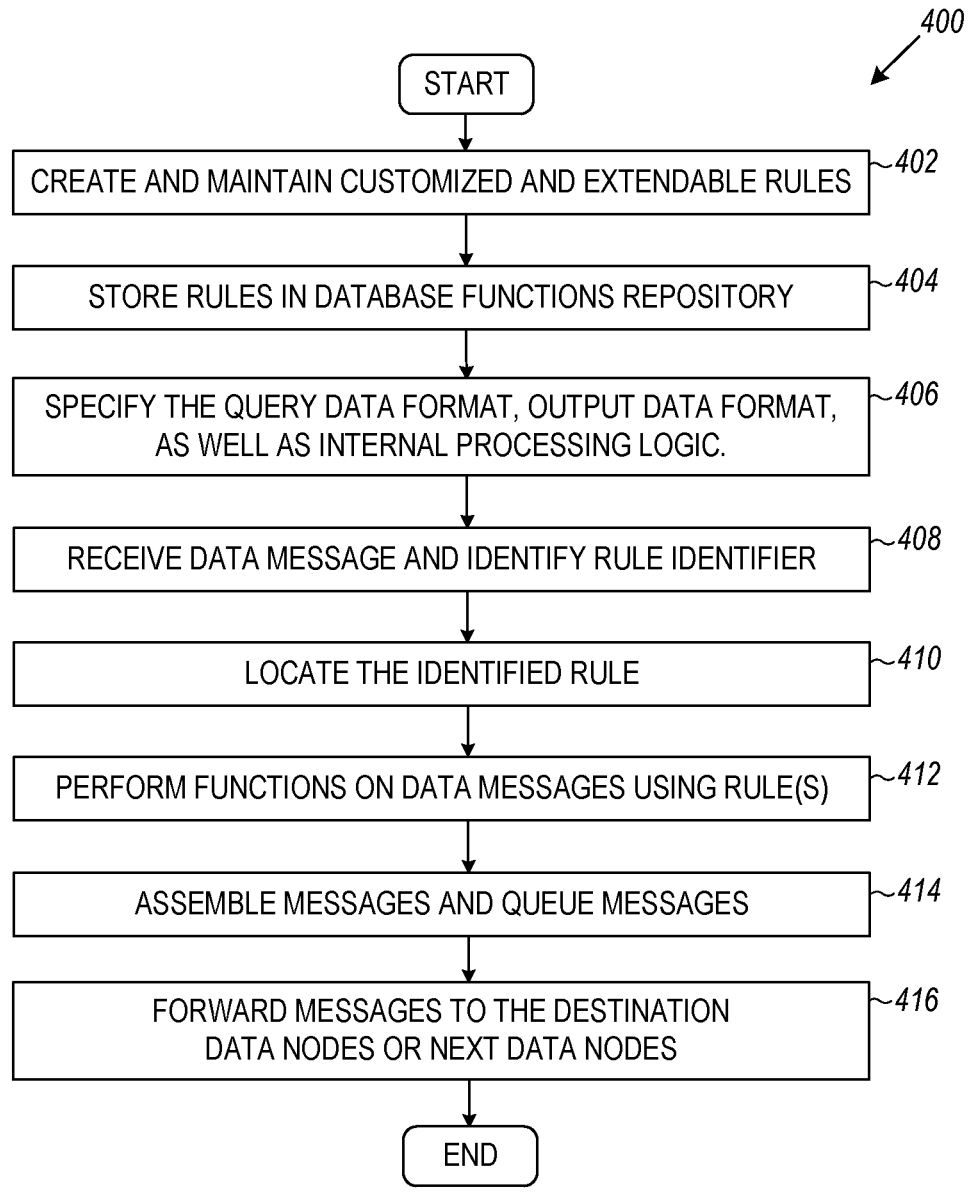
FIG. 4 is a flow chart of a process according to an example embodiment.

As referred to above, and as illustrated in FIG. 3 and FIG. 4, DFD network switch 110 can carry out database operations as well as perform conventional switching and routing functions. As explained below and illustrated in FIG. 3, DFD network switch 110 (also referenced as 300) includes one or more database functions definition rule application programming interfaces (APIs) 302, database functions rules repository 304, a database functions handling logic unit 306, a network switch core logic unit 308, and a switch fabrics hardware 310. FIG. 4 illustrates a process 400 illustrating the operation of the components 302, 304, 306, and 308.

The set of APIs 302 is provided to configure the rules for the switch to handle and process certain types of database functions associated with the data messages 202. According to one embodiment, "configuring" the rules includes creating, defining, modifying, or deleting the rules for database functions. As illustrated in FIG. 4, the APIs 302 allow a distributed database system, such as database system 100 of FIG. 1, to create and maintain (at operation 402) customized and extendable rules that are stored (at operation 404) in database functions rules repository 304. For example, the rules in the rule repository 304 can be dynamically created, modified, or removed via the APIs 302. This enables support for different distributed database systems that may have different database functions or operations, as well as different formats of the data messages being exchanged. When defining a rule for a database functions, the APIs 302 specify (at operation 406) the query data format, the output data format, as well as the internal processing logic. The database functions that can be defined by rules may include, but not limited to, the following: aggregation (e.g., distinct, sum, count, min, max, etc.); caching of exchange data (e.g., intermediate results, hash table, etc.); union/merge of results; and ordering/ranking of data.

As referred to above, rule repository 304 stores rules for database functions, wherein the rules can be dynamically created, modified, or removed via APIs 302 described above, or otherwise introduced into the repository 304. In one example embodiment, a data message 202 carries a rule identifier or information identifying a rule so that the switch 110, upon receiving (at operation 408) network packets encapsulating data messages, is able to locate (at operation 410) the rule in its rule repository 304.

Once the switch 110 locates (at operation 410) the applicable rule or rules in rule repository 304, the data messages 202 are then processed (at operation 412) by the database function handling logic unit 306 to perform the pre-defined database functions. The execution of function logic unit 306 is carried out by switch fabric hardware 310. After the functions are performed, the resulting data messages 202 are queued (at operation 414) for the switch's core logic unit 308 to forward (at operation 416) to the destination data nodes or next data nodes such as switches 110.

Core logic unit 308 in the switch 110 performs the common functionalities of a network switch, e.g., routing, classification, flow control, etc. The core logic unit 308 serves as the basic component of a network switch, and is shared by both conventional network switches and the architecture of the DFD network switch 110.

Switch fabrics hardware 310 includes the general hardware being utilized by conventional network switches, e.g., a processor, memory, and it also, in one example embodiment, incorporates specialized hardware, such as but not limited to, a co-processor, field programmable gate arrays (FPGAs), and/or application specific integrated circuits (ASICs), to efficiently perform certain database functions. Such functions include but are not limited to, hash calculations, sorting, encryption/decryption, compress/decompress, etc. With the specialized hardware, the performance of processing data messages and performing database functions is to improve significantly. However, such specialized hardware is only optional for the purpose of better performance while the majority of the defined database functions can be done without them.

Figure 5:
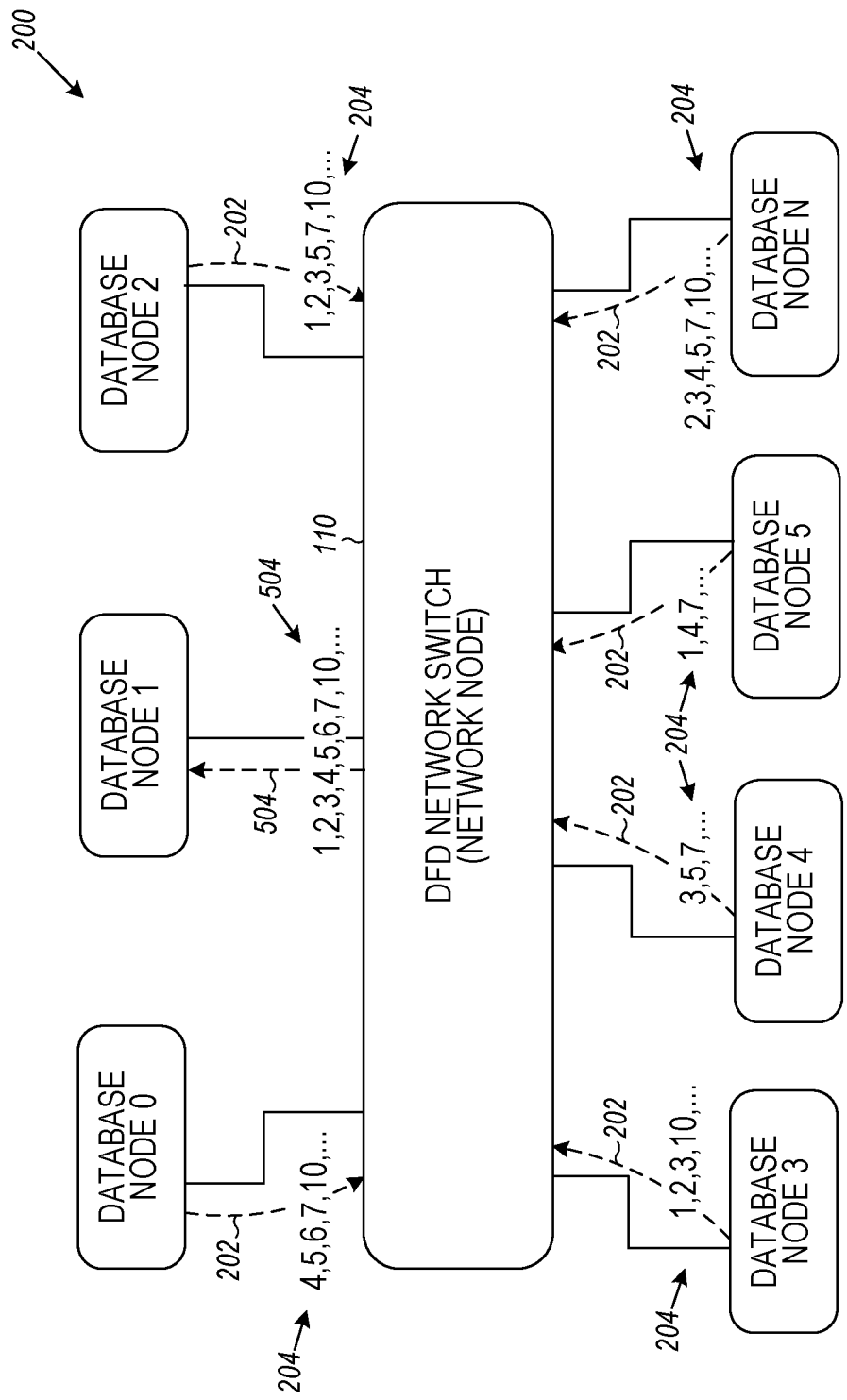
FIG. 5 is a dataflow diagram of a distributed database system according to an example embodiment.
Figure 6:
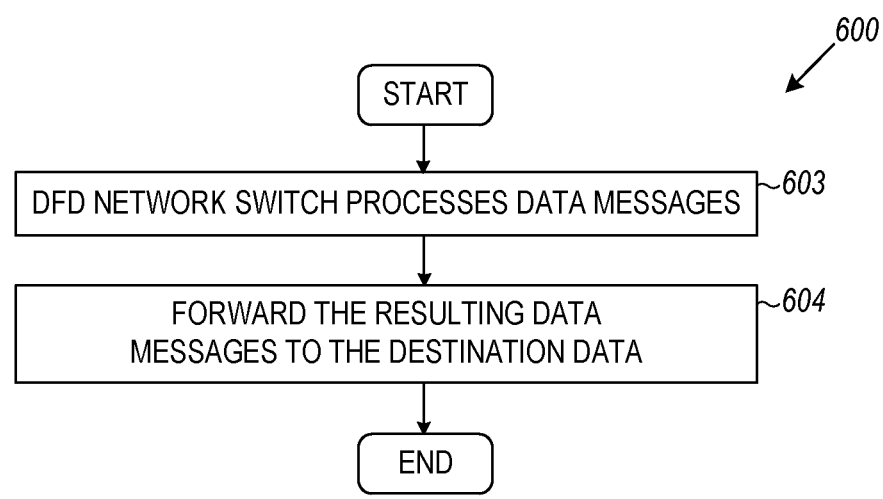
FIG. 6 is a flow chart of a process according to an example embodiment.

The data flow diagram of FIG. 5 and the process 600 illustrated in the flow chart of FIG. 6 illustrate an example embodiment wherein a DFD network switch 110 in a distributed database system 200 operates in a database functions defined mode. In this example, instead of transparently forwarding all the individual data messages 202, redundant or not, to the destination data node 1, the DFD network switch 110 processes (at operation 603) the data messages 202 from all other data nodes 0, 2-N, and only forwards (at operation 604) the resulting data messages 504 containing the unique values 502 to the destination data node 1. This saves the network bandwidth and computation capacity on the destination data node 1. Furthermore, with the help of the specialized hardware, the process overhead and delay can be largely reduced. Thus the overall performance of the same database function, for example, retrieving distinct values from previous database operations, can be improved accordingly.

Figure 7:
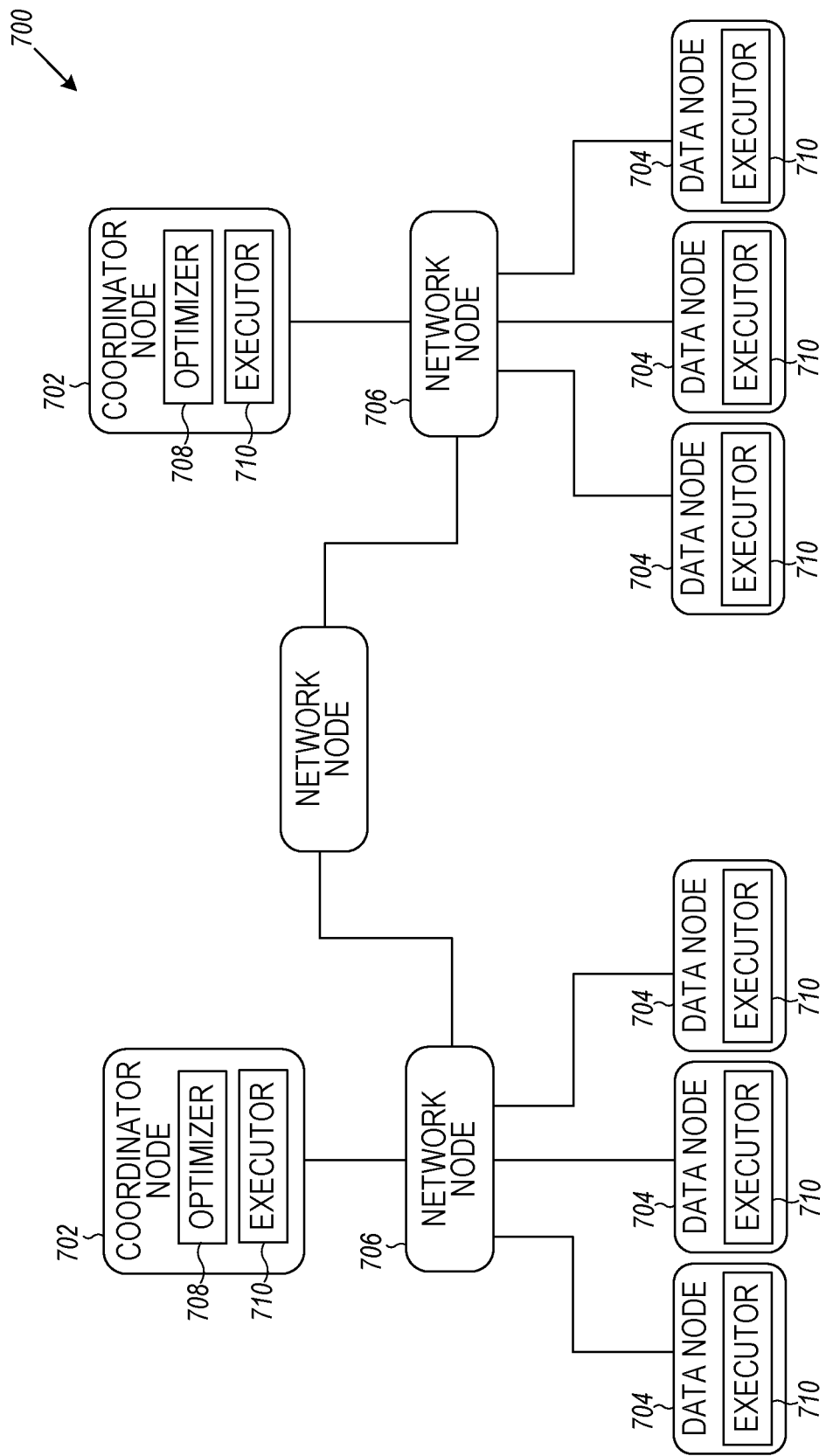
FIG. 7 is a massively parallel processing (MPP) distributed database system according to an example embodiment.

Referring now to FIG. 7, there is illustrated an embodiment of a DFD network switch 110 deployed as a network node 706 of a massively parallel processing (MPP) database infrastructure 700, wherein a coordinator node 702 may be, for example, a database host such as master host 102 of FIG. 1, and a data node 704 may be a data source such as a segment host 104, 106 and 108, also discussed with respect to FIG. 1. In this example embodiment, there is also provided an optimizer 708 and executor 710, operative on a distributed database system, to plan and coordinate the use of the database functionality in DFD network switches 110. According to one embodiment, illustrated in FIG. 7, coordinator node 702 contains or utilizes both optimizer 708 and executor 710, and data node 704 contains or utilizes only executor 710. According to one example embodiment discussed below with respect to FIG. 11, optimizer 708 accesses information concerning the capabilities of the network nodes 706 stored in is a distributed database system catalog table. According to another example embodiment discussed below with respect to FIG. 12, executor 710 obtains query plan information from optimizer 708, and uses the query plan information to execute database query operations.

While this example embodiment shows the DFD network switch 110 deployed in a distributed database infrastructure 700, the DFD network switch 110 is not limited to application in distributed database infrastructures, and may be deployed in other database infrastructures or systems. In one example embodiment optimizer 708 and executor 710 are resident on and execute on a database server system such as database server 102, which may be deployed for example as a coordinator node 702 in the system of FIG. 7.

In this example embodiment, the DFD network switches 110 perform not only conventional network routing and switching functions, to route data messages among data nodes, for example between coordinator nodes 702 and data nodes 704, but also perform pre-defined database functions, such as referred to above and described more below, that reduce and optimize the network communication among these data nodes. The DFD network switches 110 acting as network nodes 706 thus optimize database operations performance. Thus, in this embodiment and others described herein, the DFD network switch 110 is not just a network device transparent to database system, but actively performs database functions and operations on data being routed through the network.

Optimizer and Executor

According to one example embodiment, as noted above, there is provided an optimizer 708 and executor 710, operative on a distributed database system, to take advantage of the database functionality in DFD network switches 110. As noted above, according to one embodiment, coordinator node 702 contains or utilizes both optimizer 708 and executor 710, and data node 704 contains or utilizes only executor

710. Also as noted above, a database function or operation is defined in the DFD network switch 110. Such database functions include, but are not limited to: (i) aggregating intermediate results from data nodes, (ii) buffering data and building a hash table, (iii) ordering and ranking certain data, as well as (iv) making union of, or merging, intermediate results.

Figure 8:
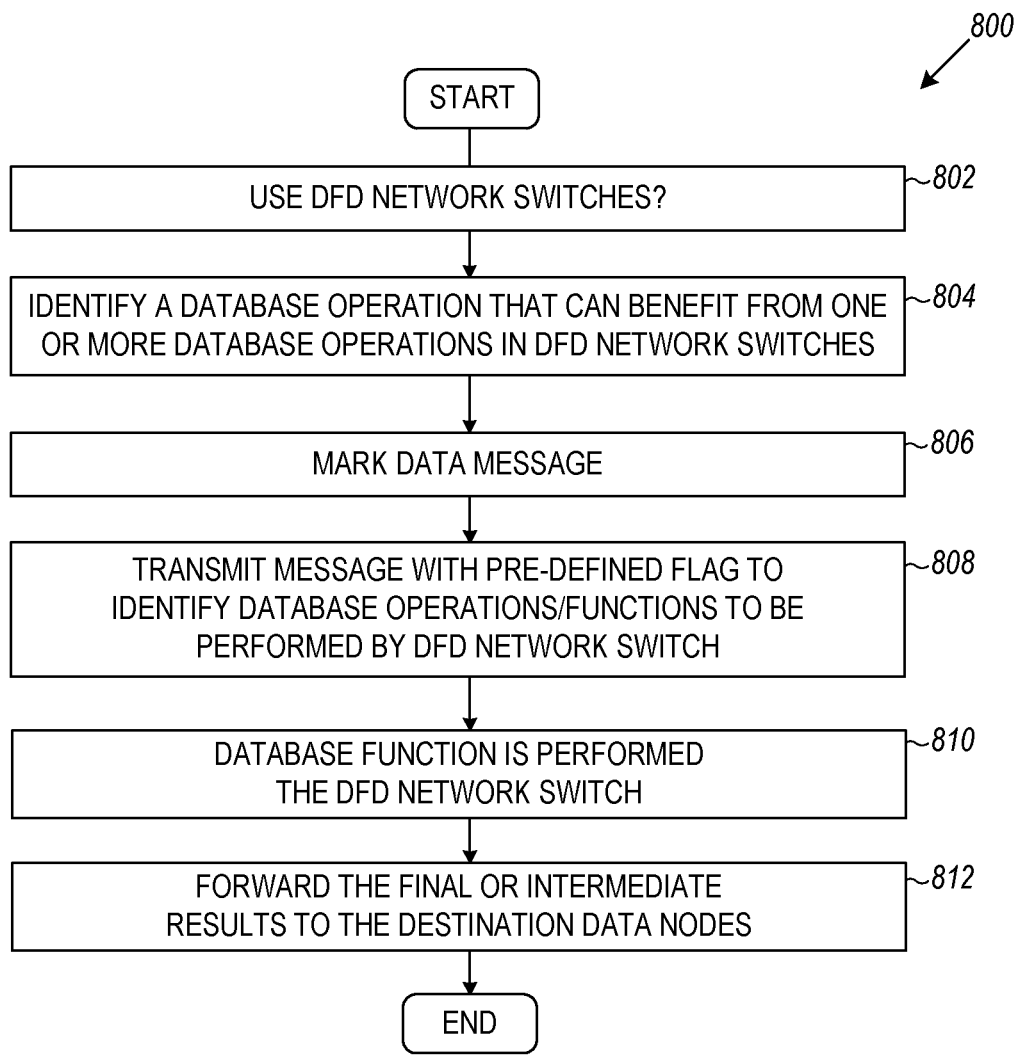
FIG. 8 is a flow chart of a process according to an example embodiment.

According to an example mode of operation illustrated in the process flow chart 800 of FIG. 8, the optimizer 708 makes a decision whether to take advantage of DFD network switches 110 when it selects (at operation 802) the optimal plan for a query. If the optimizer 708 identifies (at operation 804) a certain database operation can benefit from one or more database operations in the DFD network switches 110, it asks the data nodes 704 to mark (at operation 806) data messages it sends, and transmits them (at operation 808) with pre-defined flags to identify the data operations to be performed by the DFD network switches 110.

When the data messages carrying the matched function arrive at the node, the database function is performed (at operation 810) by the software and hardware of the DFD network switch 110, described in more detail below herein. The final or intermediate results are then forwarded (at operation 812) to the destination data nodes (coordinator nodes or data nodes) or next switches, or DFD network switches 110, depending on the network interconnection topology and query plan. As a result, the network traffic is optimized for the distributed database, for example resulting in reduced data to transport and thus reduced bandwidth requirement. Furthermore, the time to process data messages and the corresponding computation time on the associated data can be greatly saved on destination data nodes.

Figure 9:
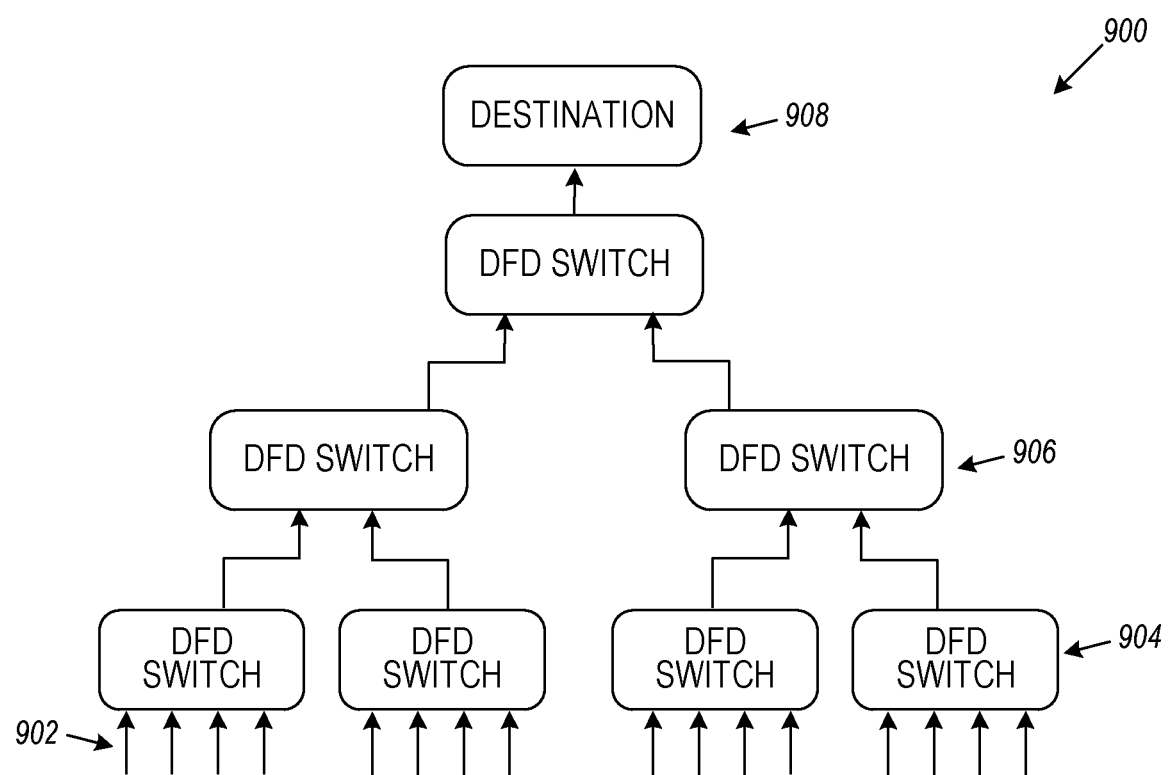
FIG. 9 is a distributed database system according to an example embodiment.
Figure 10:
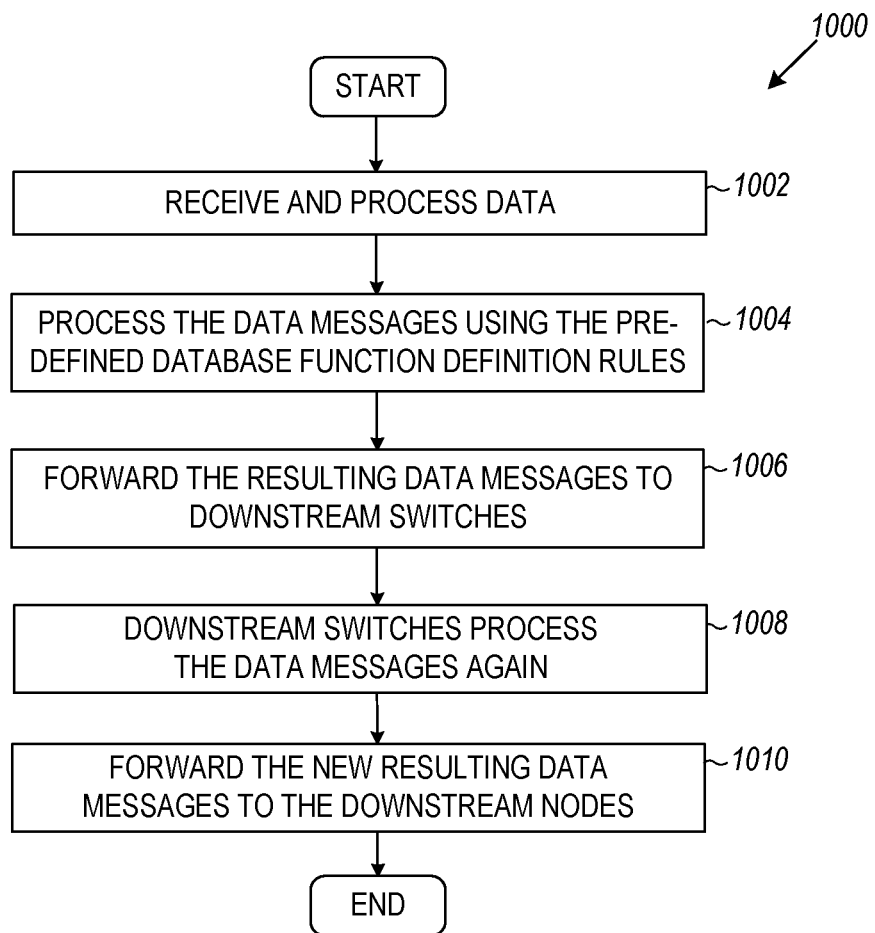
FIG. 10 is a flow chart of a process according to an example embodiment.

As noted above, in most scenarios, a distributed database system 100, 200 or 700 may include more than tens of data nodes, or even hundreds or thousands of data nodes. In such cases, according to one embodiment, multiple DFD network switches 110 are deployed and interconnected in a hierarchical or tree-like network topology 900 illustrated in FIG. 9. As illustrated in the process 1000 flow chart of FIG. 10, the upstream switches 904 receive (at operation 1002) the data messages 902 (such as message 202) from the sending data nodes and then process the data messages (at operation 1004) using the pre-defined database function-defined rules stored in a rules repository 304 (see FIG. 3). The resulting data messages are forwarded (at operation 1006) to the downstream switches 906 on the routing path of the data messages 902. Upon receiving the data messages 202 from the upstream switches 904, the downstream switches 906 process (at operation 1008) the data messages again using the pre-defined database function definition rules associated with the data messages 902, and then forward (at operation 1010) the new resulting data messages to their downstream switches 906 on the routing path of the data messages. The process continues until the data messages reach the destination 908. The embodiment of FIG. 9 and process 1000 thus illustrates such a case of multiple DFD network switches 110, where the database functions are performed at each switch 110 on the routing path of the data messages 902.

The DFD network switch 110 also handles the transport layer control messages associated with the data messages 902 it processes at operations 1004 and 1008. As an example, for the connection oriented transmission, it sends back the control information like ACK to the source node on behalf of the destination nodes if it processes and aggregates the original data messages 202. For the connectionless transmission, the processed data contains the original message ID. In either case, the distributed database executor 710 is aware of the process and handles the follow-up process, as explained below with respect to an example embodiment of an MPP executor design.

Figure 11:
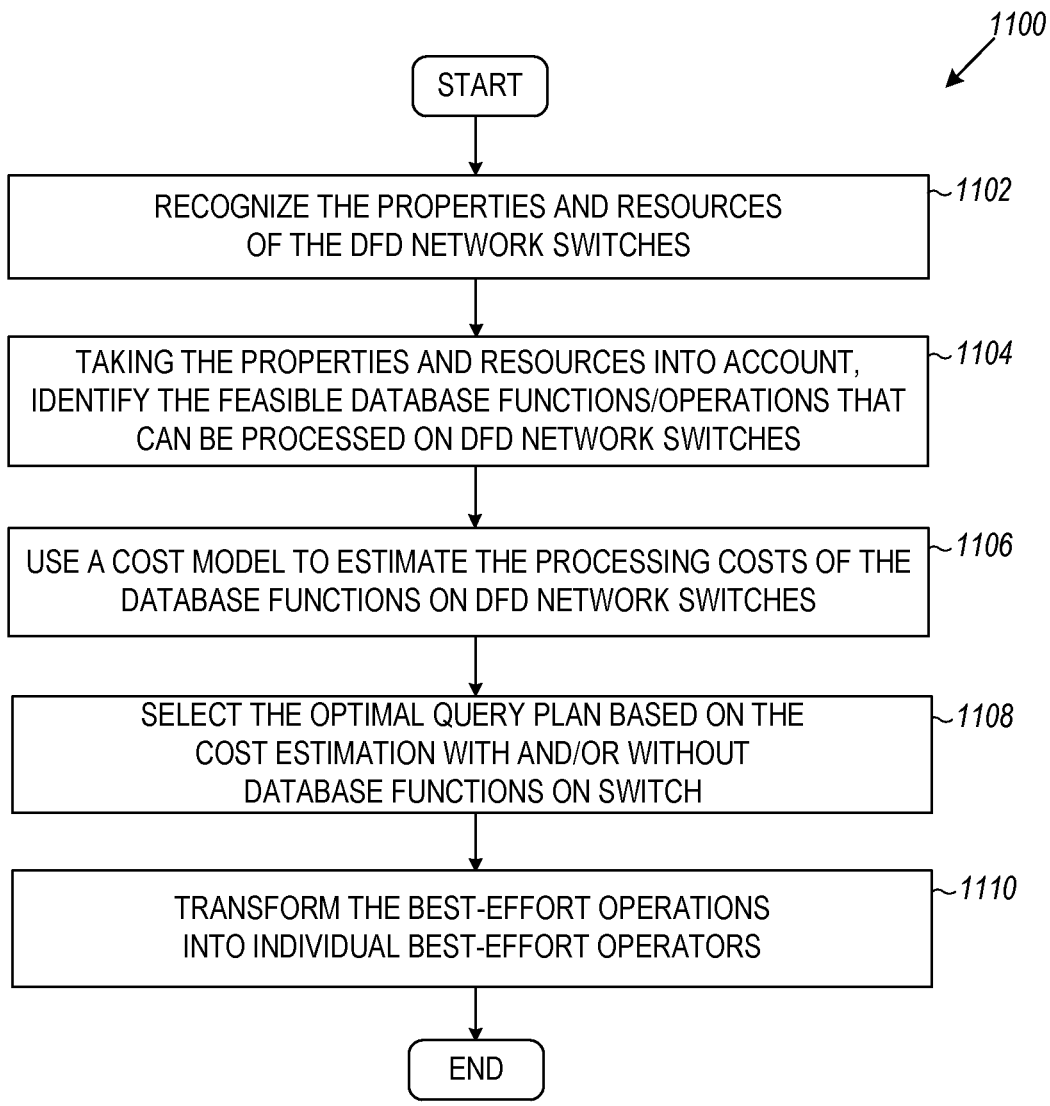
FIG. 11 is a flow chart of a process according to an example embodiment.

According to one example embodiment of an optimizer process 1100 illustrated in FIG. 11, the process 1100 performed by the optimizer 708 recognizes (at operation 1102) the properties and resources of the DFD network switches 110, for example, the properties and resources of a DFD network switch's processor, local memory, specialized hardware (e.g., FPGA's or ASIC's), and/or bandwidth. According to one embodiment, the properties and resources for a node are represented in metadata which can be stored is a distributed database system catalog table, such as may be maintained in a storage device or memory of the database system 100. Taking the properties and resources of the nodes into account, the optimizer identifies (at operation 1104) the feasible database functions/operations that can be processed on DFD network switches 110. In one example embodiment, the feasible database functions/operations on the DFD network switches 110 are also maintained in the distributed database system catalog table. In one example embodiment, the DFD network switches 110 are symmetric or assumed to be symmetric, which means the database functions/operations enabled on each data nodes are same. In another embodiment, the optimizer also recognizes scenarios where DFD network switches 110 are asymmetric and adjusts the cost estimates of best-effort operations, described below, in the DFD network switches 110 accordingly. Although DFD network switches 110 help to improve performance in general, it comes with the cost of additional calculation and related overhead. Thus, according to another example embodiment, the optimizer uses a cost model to estimate (at operation 1106) the processing costs of the database functions on DFD network switches 110, and thus the overall cost of any particular query plan. More particularly, in another example embodiment, the optimizer models and estimates (at operation 1106) the cost of best-effort operations in the data nodes, described below, as part of the cost estimation and selection (at operation 1108) of the whole query plan.

As described in more detail herein below, because DFD network switches 110 may have limited system resources, for example but not by way of limitation, limited memory/cache size and/or constrained computation power, it is possible that the database functions or operations on DFD network switches 110 cannot keep pace with or catch up to the speed/rate of data streaming expected for the main data routing task of the switch. In such a case, according to one embodiment, the DFD network switches 110 receive streaming query data contained in data messages, and only perform operations/functions on the query data that is within its capacity within a specified or desire time frame, and forward the partial processed results to the next destination nodes, together with the "skipped", unprocessed, query data.

According to one embodiment, skipped data bypasses any components of the switch 110 used to perform database functions, or alternatively is input to such components but is output without being processed. These types of database operations are defined herein as "best-effort operations." In other words, a respective database function can be performed to a state of completion that is a completed state including complete result data or to a partially performed, incomplete state, including incomplete result data. If the resources of a DFD network switch 110 is sufficient to complete the desired database function in the switch, then it is performed to a completed state. In a first mode of operation, if the resources are insufficient to perform the desire database function on all available data within a time frame, such as a desired or specified time frame, then with "best-effort" operation the DFD network switch 110 only performs the desired database function on as much data as resources allow, and passes along the unprocessed, incomplete data, together with the processed, completed data. In another mode of operation, the database function is performed to the completed state if sufficient resources are available. Any distributed database operations involving DFD network switches 110 can be potential candidates to operate as and be categorized as best-efforts operations. An example embodiment of an algorithm for different best-effort operations are described further herein below.

According to another example embodiment, the optimizer selects (at operation 1108) the optimal query plan based on the cost estimation with and/or without DFD network switches 110. Costs of query plan both with and without DFD network switches 110 and best-effort operations are estimated and saved in optimizer 708's plan choices search space. Using an effective searching algorithm, the optimizer 708 selects (at operation 1108) the most efficient query plan, and decides whether to include best-effort operations or not. Based the optimal query plan it selects (at operation 1108), the optimizer generates plan operators of best-effort operations. Once the optimal query plan is decided, optimizer transforms (at operation 1110) the best-effort operations into individual best-effort operators, e.g., best-effort aggregations, best-effort hash, etc. The details of best-effort operations and operators are described in more detail below.

Figure 12:
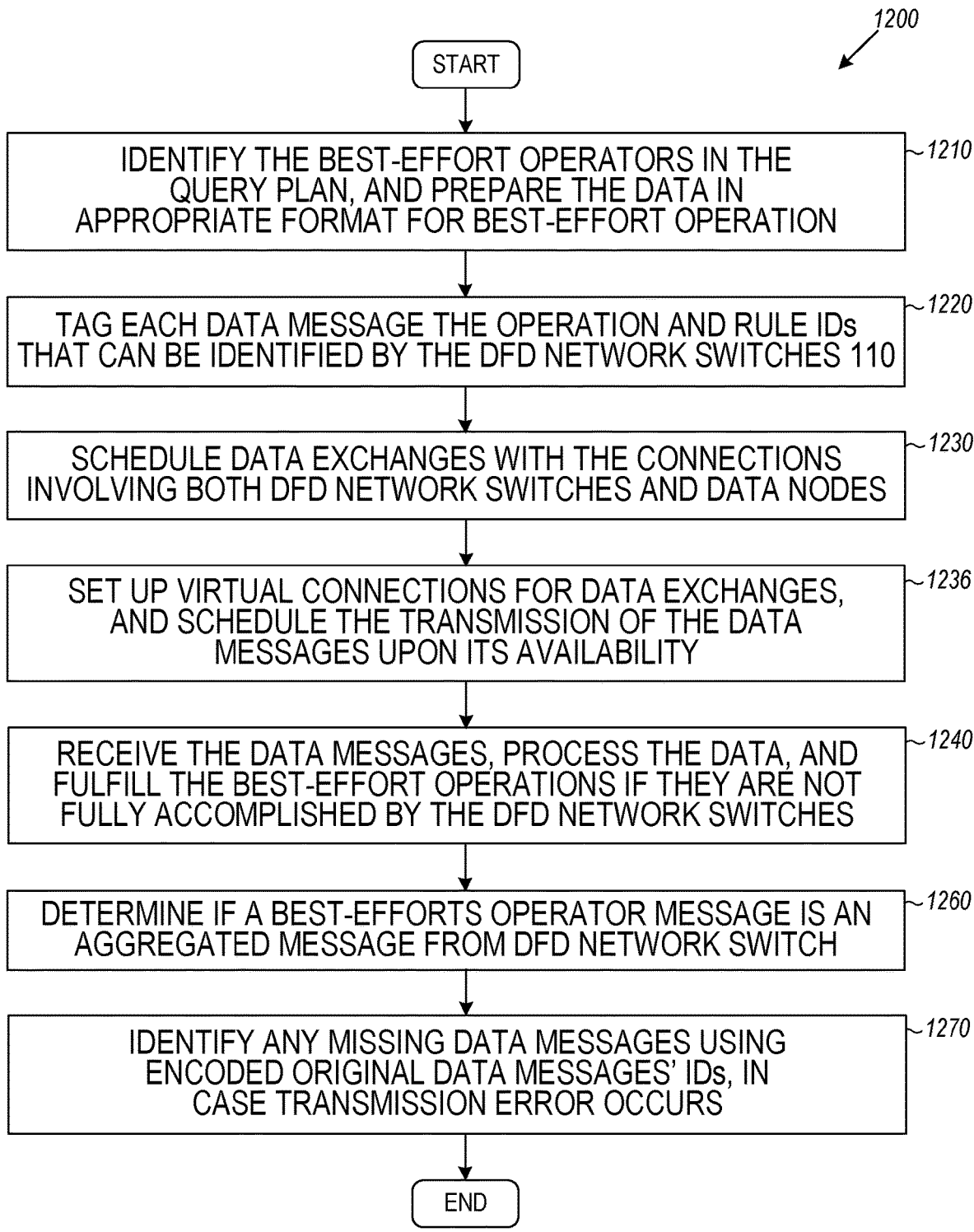
FIG. 12 is a flow chart of a process according to an example embodiment.

According to another example embodiment, a process 1200 illustrated in the flow chart of FIG. 12, is performed by an executor 710 in the distributed database, to coordinate or direct database operations in the DFD network switches 110. The executor 710 identifies (at operation 1210) the best-efforts operators in the query plan, and executes the corresponding processing logic. According to one example embodiment, the executor 710 concurrently executes multiple best-efforts operators based on a scheduling strategy to improve system utilization. As illustrated in FIG. 12, the executor 710, in one embodiment, prepares the data in appropriate format for best-effort operations. Each data message is tagged (at operation 1220) with the operation and database function-defined rule IDs that can be identified by the DFD network switches 110, along with necessary control information (e.g., corresponding plan operator information, message sequence IDs). The executor 710 schedules (at operation 1230) data exchanges with the connections involving both DFD network switches 110 and data nodes. The executor 710 sets up (at operation 1236) virtual connections for data exchanges, and schedules the transmission of the data messages upon its availability. The executor 710 processes data received for best-effort operations from both DFD network switches 110 and data nodes. After receiving (at operation 1240) the data messages, the executor 710 processes the data and fulfills the best-effort operations if they are not fully accomplished by the DFD network switches 110. In one embodiment, when a best-efforts operator message is received, if (at operation 1260) it is determined that the message is an aggregated message from the DFD network switches 110, the original data messages' IDs are encoded (at operation 1270) so that the executor 710 can identify the missing data messages in case transmission error occurs.

Thus, as described above, the disclosed embodiments provide more abundant and complete network switch infrastructure and enhanced functionalities of a distributed database, and further the DFD network switches 110 require no hardware changes on data nodes, while the hardware customization on switches is only optional to further improve the performance.

Best-Effort Processing on DFD Network Switch

Moreover, as described further below, there are provided example embodiments of logic for best-effort aggregation, best-effort sorting, and best-effort hash join, which are three major categories of performance-critical distributed database operations. These operations are major performance-critical operations in distributed database.

Figure 13:
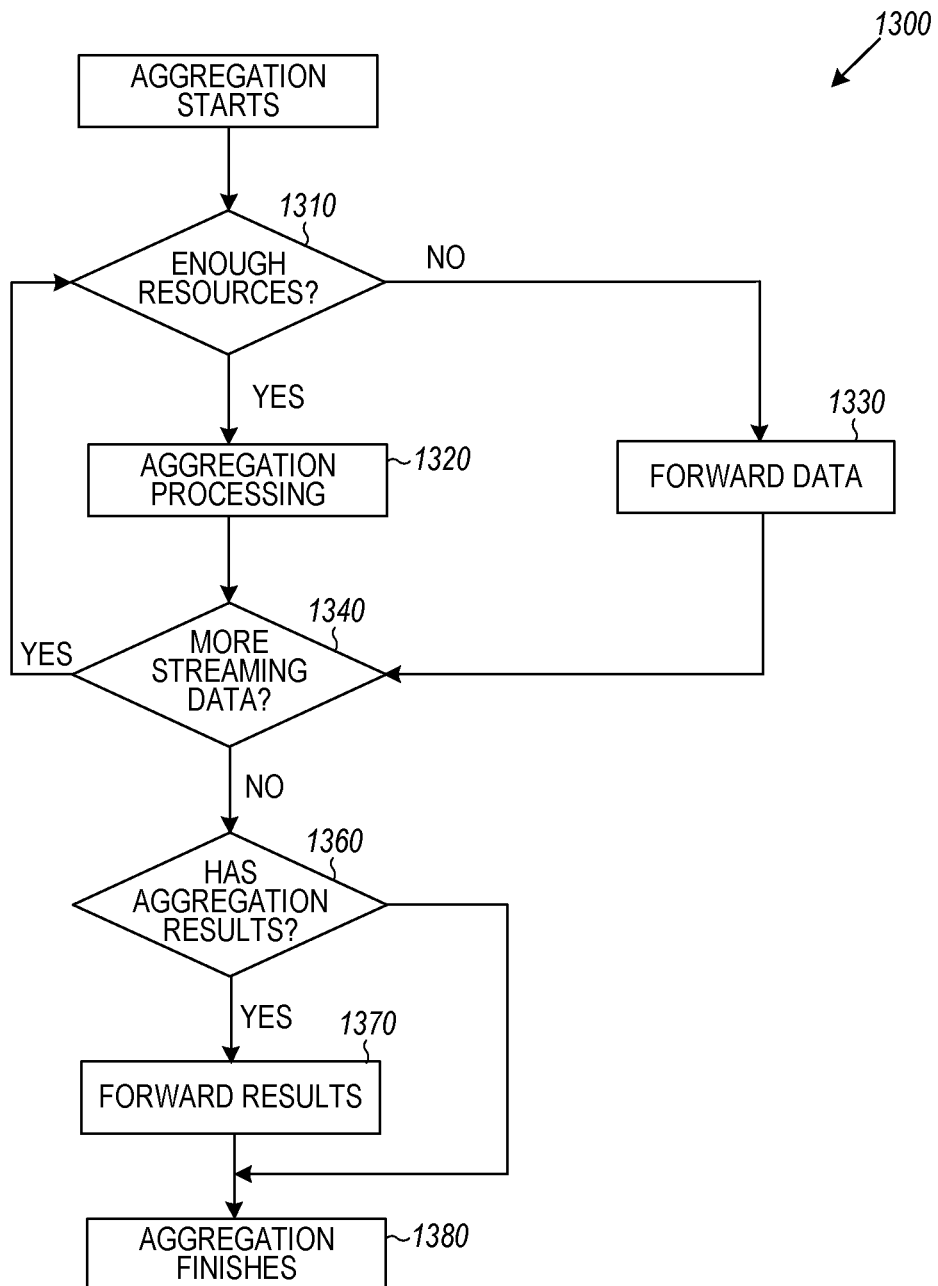
FIG. 13 is a flow chart of a process according to an example embodiment.

A flow chart of an example embodiment of processing logic 1300 of a best-effort aggregation algorithm is illustrated in FIG. 13. Here, aggregation processing is an abstraction of any one of the specified MPP aggregation operations mentioned hereinabove, for example, the DISTINCT, SUM, MIN/MAX or other operations. These operations share the same best-effort operation processing flow.

The first step in aggregation processing is to determine (at operation 1310) if there are enough resources to perform all the desired aggregation, for example by checking if the memory, cache, and computation power can satisfy the requirement to carry out the desired best-efforts aggregation. If there are enough resources, the aggregation is carried out (at operation 1320). If not, some or all of the data that could have been aggregated had enough resources been available is forwarded (at operation 1330). If more streaming data has arrived that is seeking aggregation (at operation 1340), the process returns to check for enough resources at (at operation 1310). If there is no more streaming data to aggregate, the availability of aggregation results is determined (at operation 1360), and if so, the aggregated results are forwarded (at operation 1370), and if no results available, no results are forwarded. The aggregation operation finishes at operation 1380.

Figure 14:
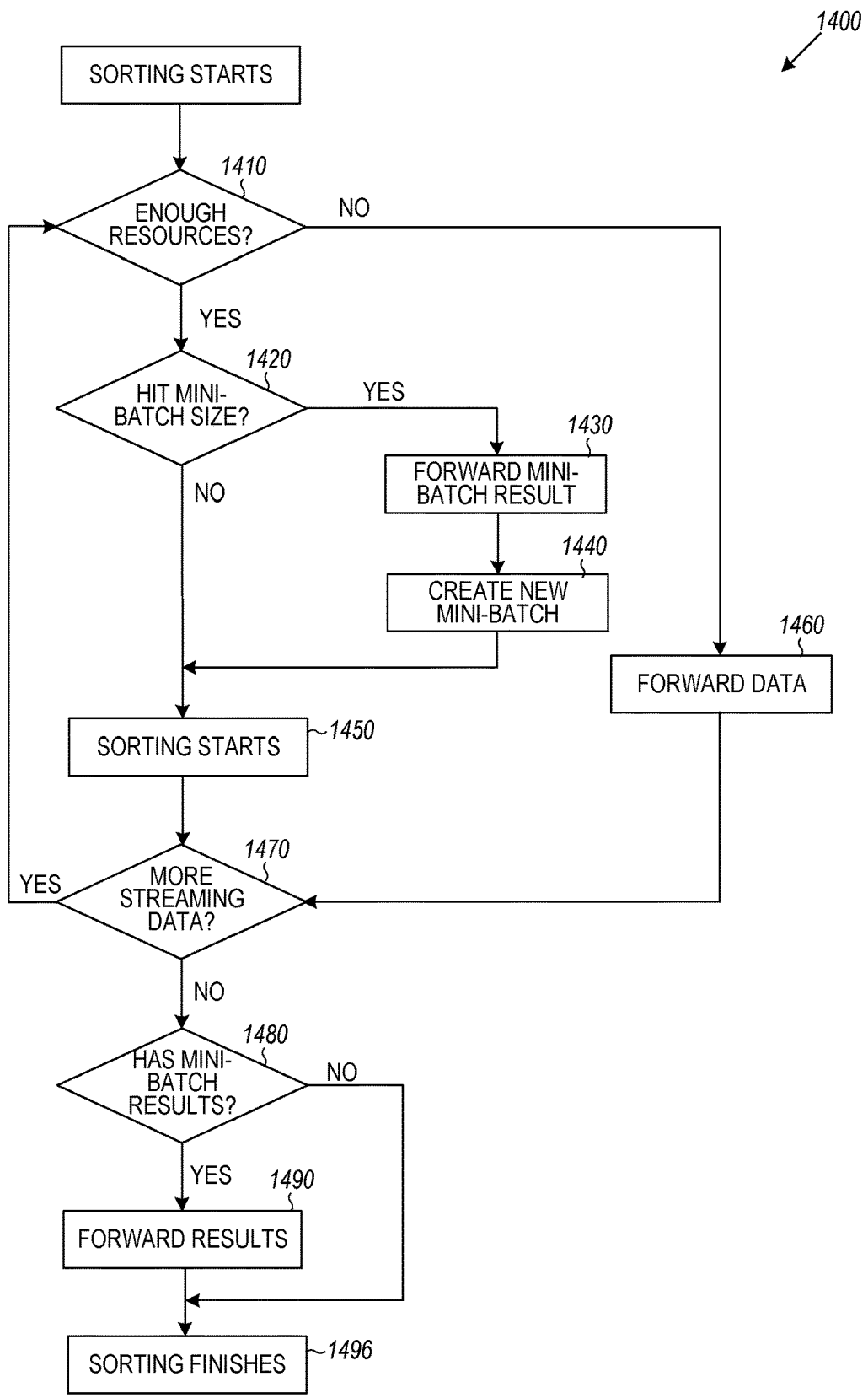
FIG. 14 is a flow chart of a process according to an example embodiment.

Sorting in a distributed database is in some cases a resource-intensive computation, so a DFD network switch 110 may be unable to finish the entire process of sorting all the data transmitted through it. Accordingly, in one example embodiment of a best-effort sorting process 1400 illustrated in the flow chart of FIG. 14, the best-effort sorting will not process all the data in one pass, but will try to separate and process the data in consecutive rounds of "mini-batches". According to one embodiment, during each round only the data within its processing capacity (which is termed a "mini-batch" herein) will be processed and the intermediate results will be transmitted to the next destination DFD network switches 110, coordinator node or data node. Process 1400 starts by determining (at operation 1410) the sufficiency of resources to perform the desire sort. If there are inadequate resources, the data is forwarded (at operation 1460). If there are sufficient resources, the process determines (at operation 1420) if the limit of the mini-batch size has been reached. According to one embodiment, the size of a mini-batch is the upper limit or a threshold that a mini-batch may hold and process the data by a DFD network switches 110. If the process has not hit the limit, the batch is processed (at operation 1450), and if it has hit the limit, the mini-batch is forwarded (at operation 1430), and a new mini-batch is formed (at operation 1440), and then processed (at operation 1450).

If (at operation 1470) more streaming data is ready to be processed, the process returns to operation 1410. If not, the process determines (at operation 1480) if mini-batch results are available, and if so, the results are forwarded (at operation 1490), and if not, the process finishes (at operation 1496). This process thus logically divides the streaming data into small processing bunches within the DFD network switch's resources limit. According to an example embodiment, distributed database operations that can leverage best-effort sorting include, but are not limited to, order, group and/or rank. Each of these sorting operations may incorporate individual different sorting algorithms, e.g., hash sort, quick sort, tournament sort, etc. These detailed sorting algorithms are mature and readily known to those of skill in the art.

Figure 15:
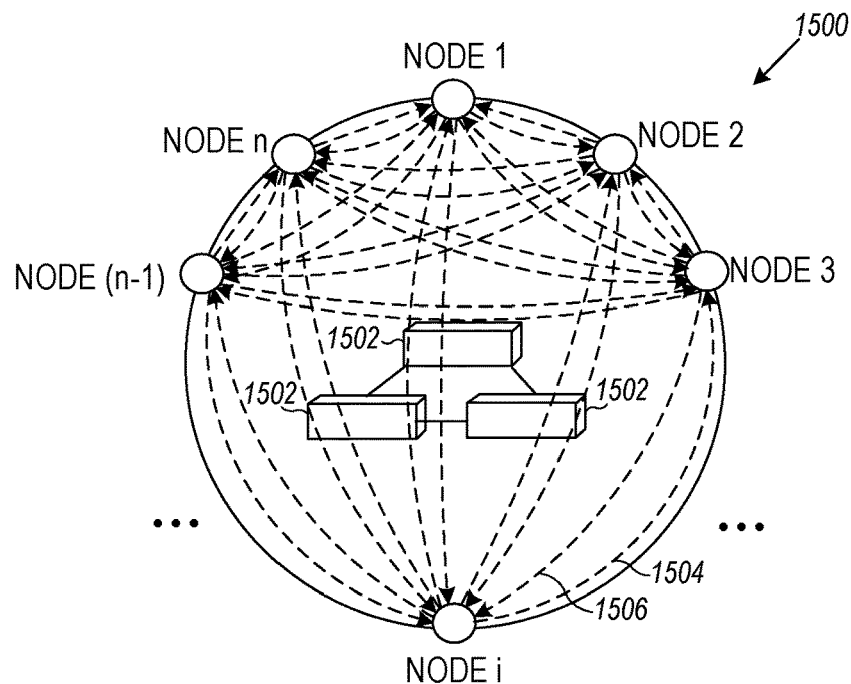
FIG. 15 is a data flow diagram and process according to an example embodiment.

When a hash join is contained out in a distributed database, one of the commonly employed processes 1500, as illustrated in the data flow diagram of FIG. 15, wherein for example network switches 1502 may be deployed as the switching network between data nodes NODE n-1, NODE n, NODE 1, NODE 2, NODE 3 and NODE i, and operated in a first, conventional mode of operation, is that the inner table of the hash join are broadcasted 1504 (labeled with respect to NODE i only for the sake of clarity in the illustration) to all the data nodes involving the hash join. In this process, each data node N (n-1, 2, 3, i) broadcasts its own local data of the inner table and receives 1506 (labeled with respect to NODE i only for the sake of clarity in the illustration) the inner table data from all other data nodes N to build a complete hash table. Then the local outer table data join the rebuilt inner table by probing the hash table. For example, for the hash join in the distributed database system that is illustrated in FIG. 15, the same local inner table data from each data node (e.g., node 1) is broadcast (n-1) to all other (n-1) data nodes. Then, after receiving all the inner table data from all other (n-1) data nodes, each data node builds the same hash table on inner table data, which means the same hash table building process is to repeated N times in the whole cluster. This whole process wastes significant network bandwidth and computation capacity.

Figure 16:
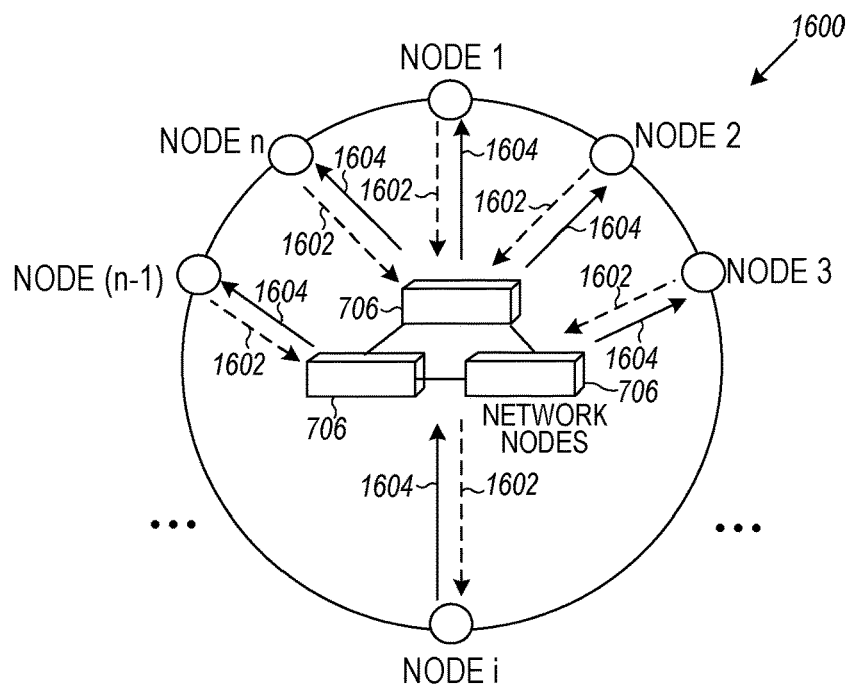
FIG. 16 is a data flow diagram and process according to an example embodiment.

On the other hand, in accordance with an example embodiment data flow process 1600 illustrated in FIG. 16, using DFD network switches 110 may be deployed in the switching network 1601 and operated in second mode of operation, a best-effort hash join, the broadcasted inner table data 1602 from each data node, NODE n and NODE (n-1), NODE 1, NODE 2, NODE 3 and NODE i, are accumulated and processed at the DFD network switches 110. The DFD network switches 110 build the hash table under the resource capacity constraints of the respective network switches 110 at the time of routing data messages. Then the built hash table 1604 (with full or partial inner table data, along with the unprocessed data if the latter) are sent in data messages to the next destination DFD network switches 110 or data nodes N. Here, if the next destination is an DFD network switch 110, the DFD network switches 110 continue to build the hash table based on the partial hash tables received from upstream DFD network switches 110. The process repeats until the fully or partially built hash table reaches the destination data nodes. Here, a DFD network switch 110 may receive duplicated hash table data from upstream DFD network switches 110, the example best-effort processing algorithm handles this kind of scenarios by a hash table merge processing which is shown in the example pseudo code set forth below.

Pseudo Code Example for Hash Table Merge Processing

```
/* Hash table processing algorithm at network nodes (NN) */
NN_Build_Hash_Table( ){
    while (ingress_data data != null){
        if (enough_resource( )){
            Check_data_flag(data);
            if (data->type == raw_data)
                hash_table = Build_Hash_Table(data->tableID,
                    data);
            else if (data->type == hash_data)
                hash_table = Merge_Hash_Table(data->tableID,
                    data);
            else
                Error(data);
            Free(data);
        }
        Else{
            /* mark the destination as well data type, etc.  */
            Make_flag(hash_table);
            /* put the hash table or data to destination queue */
            Enqueue(egress, hash_table);
            Enqueue(egress, data);
        }
    }
    if (hash_table != null){
        /* mark the destination as well data type, etc.  */
        Make_flag(hash_table);
        /* put the hash table or data to destination queue */
        Enqueue(egress, hash_table);
    }
}
```

Accordingly, in the above example embodiment, instead of sending and receiving inner table data to/from all other (n-1) data nodes, in a best case scenario, each data node can reduce its data exchange to only one DFD network switch 110, without a need to build a hash table locally, which can save significant network bandwidth and computation capacity of each data node.

Figure 17:
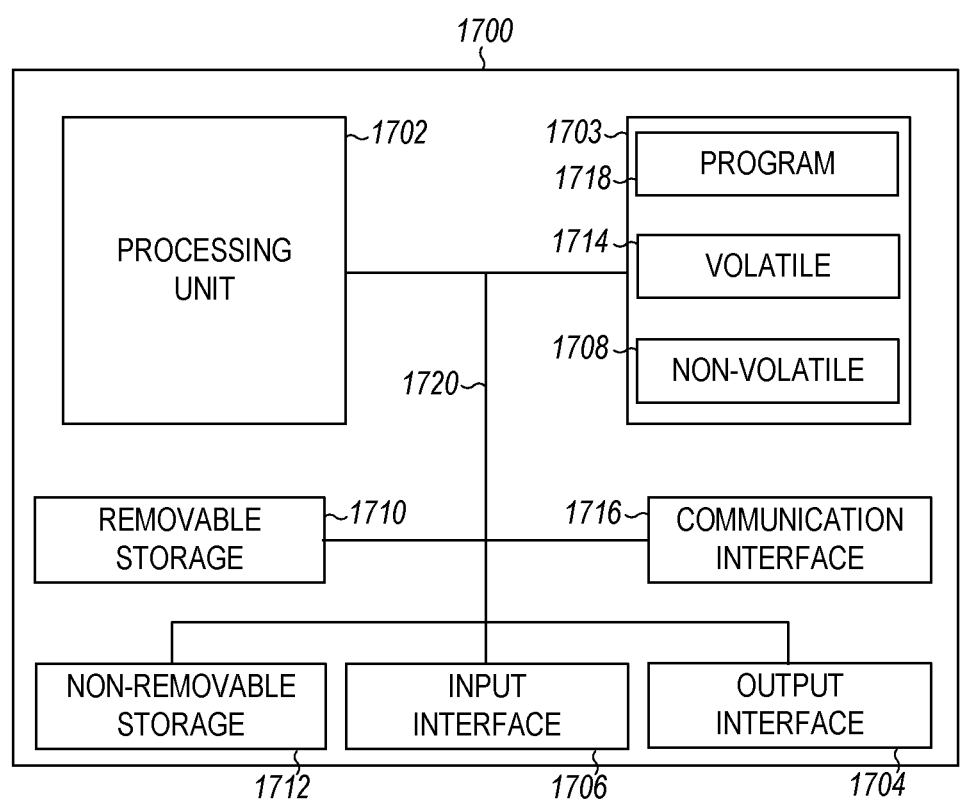
FIG. 17 is a block diagram illustrating circuitry for clients, servers, cloud based resources for implementing algorithms and performing methods according to example embodiments.

FIG. 17 is a block diagram illustrating circuitry for performing methods according to example embodiments. In particular, in one example embodiment, computing devices as illustrated in FIG. 17 are used to implement the data nodes described above, the master host 102, the segment hosts 104, the DFD network switches 110, the DFD rules APIs 302, the database functions rules repository 304, the database functions handling logic unit 306, the network switch core logic unit 308, and/or the switch fabrics hardware 310. However, not all components shown in FIG. 17 need be used in all of the various embodiments. For example, database system 100 and DFD network switch 110 may each use a different sub-set of the components illustrated in FIG. 17, or additional components.

One example computing device in the form of a computer 1700 may include a processing unit 1702, memory 1703, removable storage 1710, and non-removable storage 1712. Although the example computing device is illustrated and described as computer 1700, the computing device may be in different forms in different embodiments. For example, the computing device may instead be a smartphone, a tablet, smartwatch, or other computing device including the same or similar elements as illustrated and described with regard to FIG. 17. Devices, such as smartphones, tablets, and smartwatches, are generally collectively referred to as mobile devices or user equipment. Further, although the various data storage elements are illustrated as part of the computer 1700, the storage may also or alternatively include cloud-based storage accessible via a network, such as the Internet or server based storage.

Memory 1703 may include volatile memory 1714 and non-volatile memory 1708. Computer 1700 may include— or have access to a computing environment that includes—a variety of computer-readable media, such as volatile memory 1714 and non-volatile memory 1708, removable storage 1710 and non-removable storage 1712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1700 may include or have access to a computing environment that includes input interface 1706, output interface 1704, and a communication interface 1716. Output interface 1704 may include a display device, such as a touchscreen, that also may serve as an input device. The input interface 1706 may include one or more of a touchscreen, touchpad, mouse, keyboard, camera, one or more device-specific buttons, one or more sensors integrated within or coupled via wired or wireless data connections to the computer 1700, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1700 are connected with a system bus 1720.

Computer-readable instructions stored on a computer-readable medium are executable by the processing unit 1702 of the computer 1700, such as a program 1718. The program 1718 in some embodiments comprises software that, when executed by the processing unit 1702, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN).

Thus, as described above, the embodiments described herein provide an advantageous switch and network of switches in a distributed database system, and an innovative infrastructure for a distributed database which includes special DFD network switches 110 beside conventional coordinator nodes and data nodes. Instead of just routing and forwarding data messages as a conventional network switch does, in one example embodiment the DFD network switches 110: i) define database functions to be performed as rules via a set of APIs; ii) dynamically maintain the supported database functions rules in a repository; iii) perform the database functions on data messages matching predefined rules; and/or iv) forward intermediate results to destination node or next switches.

Also, an example embodiment of an infrastructure for a distributed database includes the following components to take advantage of these data nodes using: i) an DFD network switches-aware optimizer that recognizes DFD network switches 110 and identifies the feasible pre-defined database functions to be processed by DFD network switches 110, estimates the cost of operations in a query plan, with or without best-efforts operation, and eventually selects the optimal query plan that can perform best with the advantages of DFD network switches 110; and/or ii) a DFD network switches-incorporate executor that schedules and carries out best-effort operations with special handling of best-efforts operators that involve DFD network switches 110, e.g., best-effort aggregation, DFD network switch enabled data exchange, along with other feasible network functions, by considering the different system resources constraints on DFD network switches 110. Thus, with the introduction of DFD network switches 110 in a distributed database, the DFD network switches-aware optimizer has more options when making optimal query plan where some of the database functions can be contained out by network-node-incorporate executor of the distributed database. Thus, the overall performance of a distributed database can be improved in many scenarios.

Further, there are described herein example embodiments of an infrastructure of a distributed database including database functions-defined (DFD) switches including processing logic and algorithms to carry out three major best-effort performance critical distributed database operations: aggregation, sorting and hash join. The operation of distributed database takes advantages of such data nodes so that unprocessed or partially processed data can be continuously processed in a best-effort manner by the downstream data nodes, and eventually processed by the destination coordinator or data nodes with much reduced and processed data. Accordingly, with the example embodiments of the best-effort operations for a distributed database, the DFD network switches 110 in an infrastructure of a distributed database are leveraged to optimize network traffic, reduce data transfer and bandwidth requirements, and save computation capacity on coordinator and data nodes. The overall distributed database system performance can thus be improved.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claim.

What is claimed is:

1. A method performed at a network switch, comprising:
   detecting, using one or more processors, rule identification information within a data message received at the network switch;
   retrieving, using the one or more processors, a rule from a database functions rules repository based on the rule identification information within the received data message;
   identifying, using the one or more processors, a database function corresponding to the retrieved rule, the retrieved rule further defining a query data format for the database function;
   performing, using the one or more processors, the database function on query data contained in the data message, the query data being in the query data format, the database function being performed during a first mode of operation or a second mode of operation, the database function transforming the query data to produce result data, the database function being performed on the query data in the first mode of operation to a state of full completion by generating complete result data and no skipped query data, or the database function being performed in the second mode of operation to a state of partial completion by generating partially complete result data and skipped query data; and performing, using the one or more processors, one or more network switch functions to route the complete result data, or to route the partially complete result data and the skipped query data, to one or more destination nodes.

2. The method according to claim 1, wherein the database function comprises one or more of an aggregation function, a caching function, a hashing function, a union/merge function, or an ordering/ranking function.

3. The method according to claim 1, wherein the network switch is associated with a plurality of network switches arranged in a hierarchy, and wherein the partially complete result data is further processed in a second network switch of the plurality of network switches, the second network switch receiving the partially complete result data from the network switch.

4. The method according to claim 1, wherein the query data is retrieved from one or more data storage sources, the query data being carried in the data message.

5. The method according to claim 1, wherein performing the database function in the first mode of operation or in the second mode of operation is determined based at least in part on processing resources of the network switch available to perform the database function.

6. The method according to claim 5, wherein the processing resources comprise one or more of memory, time, or processor bandwidth.

7. The method according to claim 1, further comprising:
performing the database function using at least one database function rule.

8. The method according to claim 1, wherein the one or more network switch functions further comprise classification functions or flow control functions.

9. The method according to claim 1, further comprising:
routing the data message including the complete result data, or the partially complete result data and the skipped query data, to the one or more destination nodes.

10. A network switch, comprising:
a non-transitory memory storage comprising instructions; and
one or more processors in communication with the memory, wherein the one or more processors execute the instructions to:
detect rule identification information within a data message received at the network switch;
retrieve a rule from a database functions rules repository based on the rule identification information within the received data message;
identify a database function corresponding to the retrieved rule, the retrieved rule further defining a query data format for the database function;
perform the database function on query data carried in the data message, the query data being in the query data format, the database function being performed during a first mode of operation or a second mode of operation, the database function transforming the query data to produce result data, the database function being performed on the query data in the first mode of operation to a state of full completion by generating complete result data and no skipped query data, or the database function being performed on a best-effort basis in the second mode of operation to a state of partial completion by generating partially complete processed result data and skipped query data; and perform one or more network switch functions to route the complete processed result data to one or more destination nodes, or to route the partially complete processed result data and the skipped query data, to the one or more destination nodes.

11. The network switch according to claim 10, further including a database server to process a database query requiring the query data carried in the data message to be retrieved from one or more data storage sources.

12. The network switch according to claim 10, further comprising a database function handling circuitry configured to perform the database function on the query data, wherein the best-effort basis is determined at least in part based on processing capacity of the database function handling circuitry.

13. The network switch according to claim 10, further comprising a data storage to store at least one database function rule to perform the database function on the query data.

14. The network switch according to claim 10, wherein the database function is at least one of a routing function, a classification function, or a flow control function.

15. The network switch according to claim 10, wherein after the database function is performed, the complete processed result data or the partially complete processed result data is included in one or more data messages that are queued for forwarding to the one or more destination nodes.

16. The network switch according to claim 10, wherein the rule identification information in the data message further comprises pre-defined flags corresponding to the database function to be performed on the query data carried in the data message.

17. A non-transitory computer-readable media storing computer instructions that when executed by one or more processors of a network switch, cause the one or more processors to perform operations comprising:
detecting rule identification information within a data message received at the one or more processors;
retrieving a rule from a database functions rules repository based on the rule identification information within the received data message;
identifying a database function corresponding to the retrieved rule, the retrieved rule further defining a query data format for the database function;
performing the database function on query data contained in the data message, the query data being in the query data format, the database function being performed during a first mode of operation or a second mode of operation, the database function transforming the query data to produce result data, the database function being performed on the query data in the first mode of operation to a state of full completion by generating complete result data and no skipped query data, or the database function being performed on the query data in the second mode of operation to a state of partial completion by generating partially complete result data and skipped query data; and
routing the complete result data, or routing the partially complete result data and the skipped query data, to one or more destination nodes.

18. The computer-readable media according to claim 17, wherein the instructions further cause the one or more processors to perform the database function to the state of full completion or to the state of partial completion based on processing resources of the network switch available to perform the database function.

19. The computer-readable media according to claim 17, wherein at least one destination node of the one or more destination nodes comprises a database server configured to generate a query requesting the query data.

20. The computer-readable media according to claim 19, further comprising an application programming interface (API) for creating or modifying the database function.

* * * * *